US010761272B2

(12) United States Patent
Hosseini et al.

(10) Patent No.: US 10,761,272 B2
(45) Date of Patent: *Sep. 1, 2020

(54) LARGE SCALE STEERABLE COHERENT OPTICAL SWITCHED ARRAYS

(71) Applicant: Analog Photonics LLC, Boston, MA (US)

(72) Inventors: Ehsan Hosseini, Milton, MA (US); Michael Watts, Hingham, MA (US)

(73) Assignee: Analog Photonics LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/457,158

(22) Filed: Jun. 28, 2019

(65) Prior Publication Data

US 2019/0324214 A1  Oct. 24, 2019

Related U.S. Application Data

(63) Continuation of application No. 15/927,037, filed on Mar. 20, 2018, now Pat. No. 10,338,321.

(60) Provisional application No. 62/473,689, filed on Mar. 20, 2017.

(51) Int. Cl.
| H04B 10/11 | (2013.01) |
| G02B 6/35 | (2006.01) |
| G02F 1/01 | (2006.01) |
| H04Q 11/00 | (2006.01) |
| H04B 10/27 | (2013.01) |
| G02B 6/34 | (2006.01) |

(52) U.S. Cl.
CPC ......... *G02B 6/3556* (2013.01); *G02B 6/3512* (2013.01); *G02B 6/3526* (2013.01); *G02B 6/3534* (2013.01); *G02B 6/3558* (2013.01); *G02F 1/011* (2013.01); *G02F 1/0147* (2013.01); *H04B 10/11* (2013.01); *H04B 10/27* (2013.01); *H04Q 11/0005* (2013.01); *G02B 6/34* (2013.01); *G02B 6/3548* (2013.01); *G02B 6/3596* (2013.01); *H04Q 2011/0035* (2013.01); *H04Q 2011/0041* (2013.01)

(58) Field of Classification Search
CPC .................................. G02B 6/35; H04B 10/11
See application file for complete search history.

(56) References Cited

U.S. PATENT DOCUMENTS

| 6,538,780 | B1 | 3/2003 | Murphy et al. | |
| 6,795,655 | B1 * | 9/2004 | Sidorovich | ........ H04B 10/1125 |
| | | | | 398/118 |
| 10,338,321 | B2 * | 7/2019 | Hosseini | .............. G02B 6/3526 |
| 2004/0086220 | A1 | 5/2004 | Mino et al. | |

(Continued)

OTHER PUBLICATIONS

Hulme et al., "Fully integrated hybrid silicon two dimensional beam scanner", OSA, 2015.*

*Primary Examiner* — Shi K Li
(74) *Attorney, Agent, or Firm* — Young Basile Hanlon & MacFarlane, P.C.

(57) ABSTRACT

Aspects of the present disclosure describe large scale steerable optical switched arrays that may be fabricated on a common substrate including many thousands or more emitters that may be arranged in a curved pattern at the focal plane of a lens thereby allowing the directional control of emitted light and selective reception of reflected light suitable for use in imaging, ranging, and sensing applications including accident avoidance.

37 Claims, 15 Drawing Sheets

(56) References Cited

U.S. PATENT DOCUMENTS

2006/0062514 A1 3/2006 Agranat
2017/0350964 A1* 12/2017 Kaneda .................. G01S 7/483
2018/0341066 A1* 11/2018 Han ..................... G02B 6/3516
2019/0265574 A1* 8/2019 Skirlo .................. G01S 7/4813

* cited by examiner

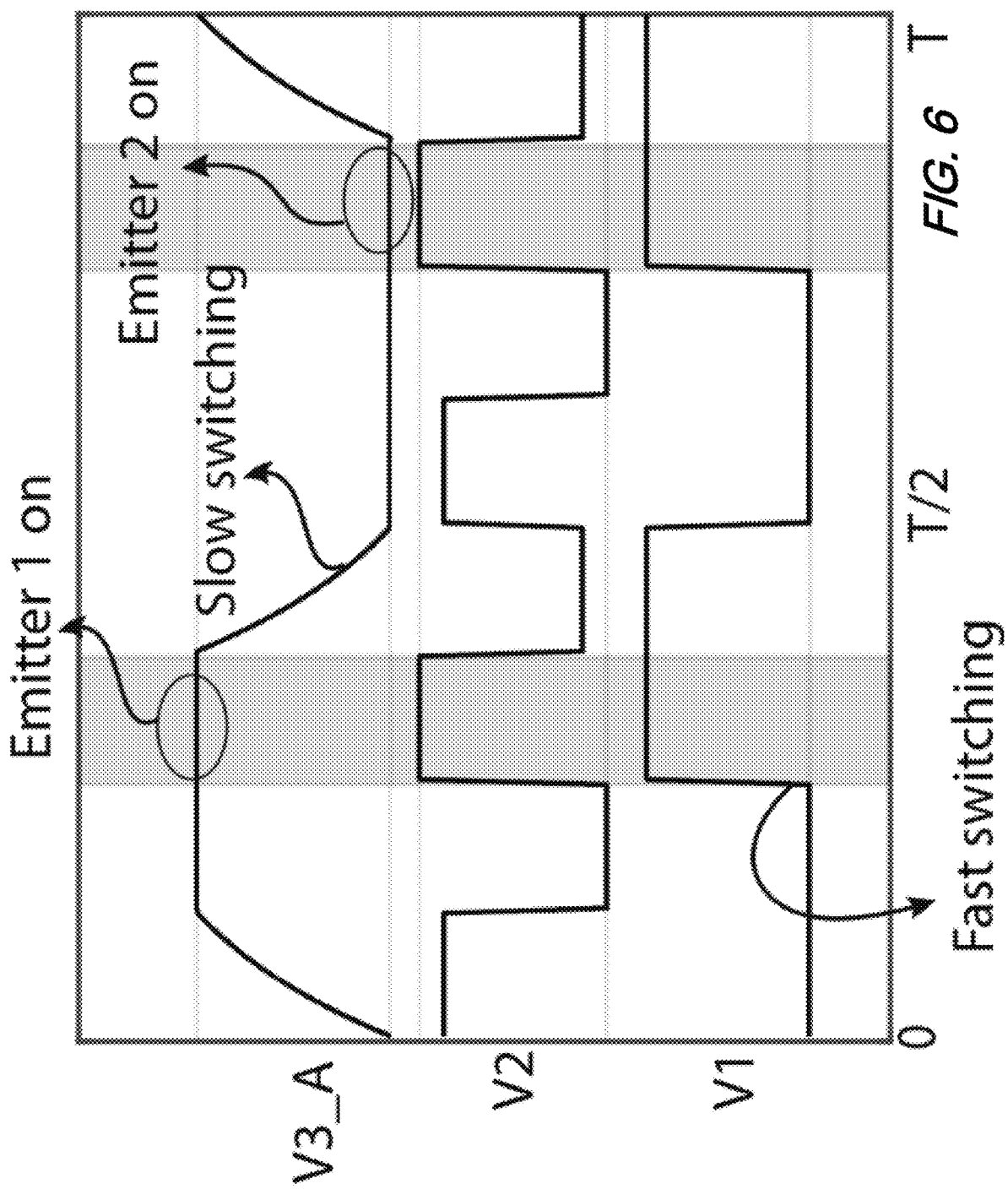

US 10,761,272 B2

LARGE SCALE STEERABLE COHERENT OPTICAL SWITCHED ARRAYS

CROSS REFERENCE TO RELATED APPLICATIONS

This application is a continuation of U.S. patent application Ser. No. 15/927,037 filed Mar. 20, 2018, which claims the benefit of U.S. Provisional Patent Application Ser. No. 62/473,689 filed 20 Mar. 2017, both of which are incorporated by reference as if set forth at length herein.

TECHNICAL FIELD

This disclosure relates generally to beam steering of light and more particularly to large scale optical phased arrays (OPA) that steer coherent light.

BACKGROUND

Recent advancements in silicon photonics fabrication technologies has precipitated the development of nanophotonic optical arrays that have proven useful in a number of contemporary applications including light detection and ranging (LiDAR), free space communications and holographic displays. Given their utility, further development and/or improvement of nanophotonic optical arrays would represent a welcome addition to the art.

SUMMARY

An advance in the art is made according to aspects of the present disclosure directed to large scale steerable optical switched arrays that may be advantageously fabricated on a common substrate and include many thousands or more emitters.

In illustrative embodiments the emitters may be arranged in a curved pattern at the focal plane of a lens thereby allowing the directional control of emitted light and selective reception of reflected light suitable for use in imaging, ranging, and sensing applications including accident avoidance.

BRIEF DESCRIPTION OF THE DRAWING

A more complete understanding of the present disclosure may be realized by reference to the accompanying drawing in which:

FIG. 6 is a series of timing diagrams illustrating that switching time constant(s) of higher level switches may be longer than in prior stages according to aspects of the present disclosure;

Figure 1:
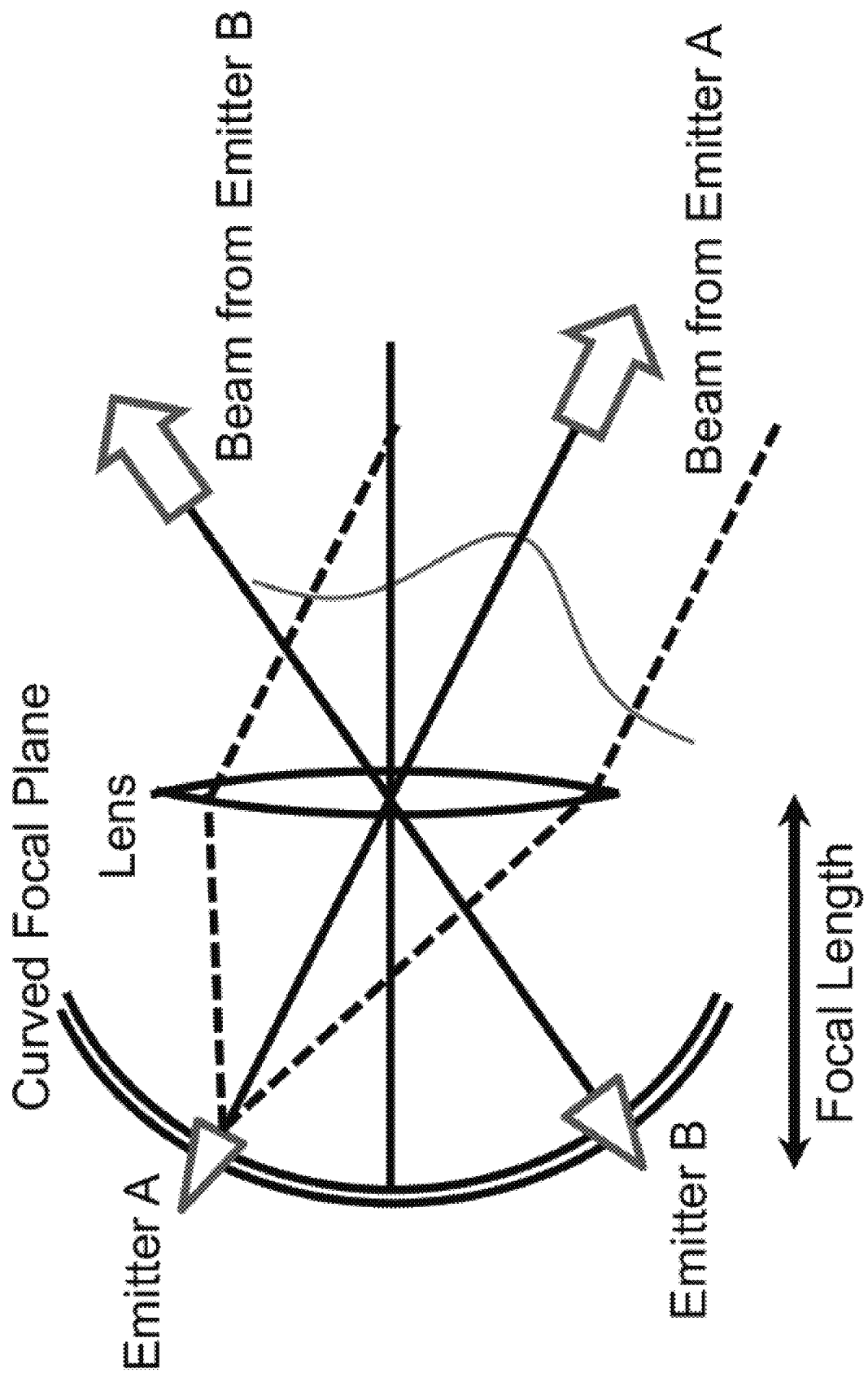
FIG. 1 is a schematic diagram illustrating emitters positioned on a curved focal plane radiate collimated beams in different directions in to a far field according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor (s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of further background and it is noted that—in general—an "ideal" single lens imaging plane is not flat. Such a principle was noted as early as the 19$^{th}$ century by Joseph Petzval—among others—and is used by photographers to capture images having an in-focus central portion and a sharply out-of-focus periphery. As a more specific example, the image sensor array of state-of-the-art, modern telescopes—such as the Kepler space observatory—is curved.

As will be known and appreciated by those skilled in the art—based on time reversal symmetry—if an array of light emitters is positioned on a curved focal plane of a lens, light beams emitting from all the emitters are imaged to infinite distance (and therefore are collimated) but at different angles.

Such principle is shown in FIG. 1 which shows a schematic illustrating the placement of optical emitters (i.e., lens(es) such as the double convex lens shown) positioned on a curved focal plane radiate collimated beams in different directions in to a far field. While not specifically shown in this FIG. 1, it is noted that through judicious choice(s) of optical elements (lenses) the shape of the focal plane may be altered to one that is flatter. Such a flat focal plane in conjunction with suitable optical elements including lenses is shown and described later.

Figure 2:
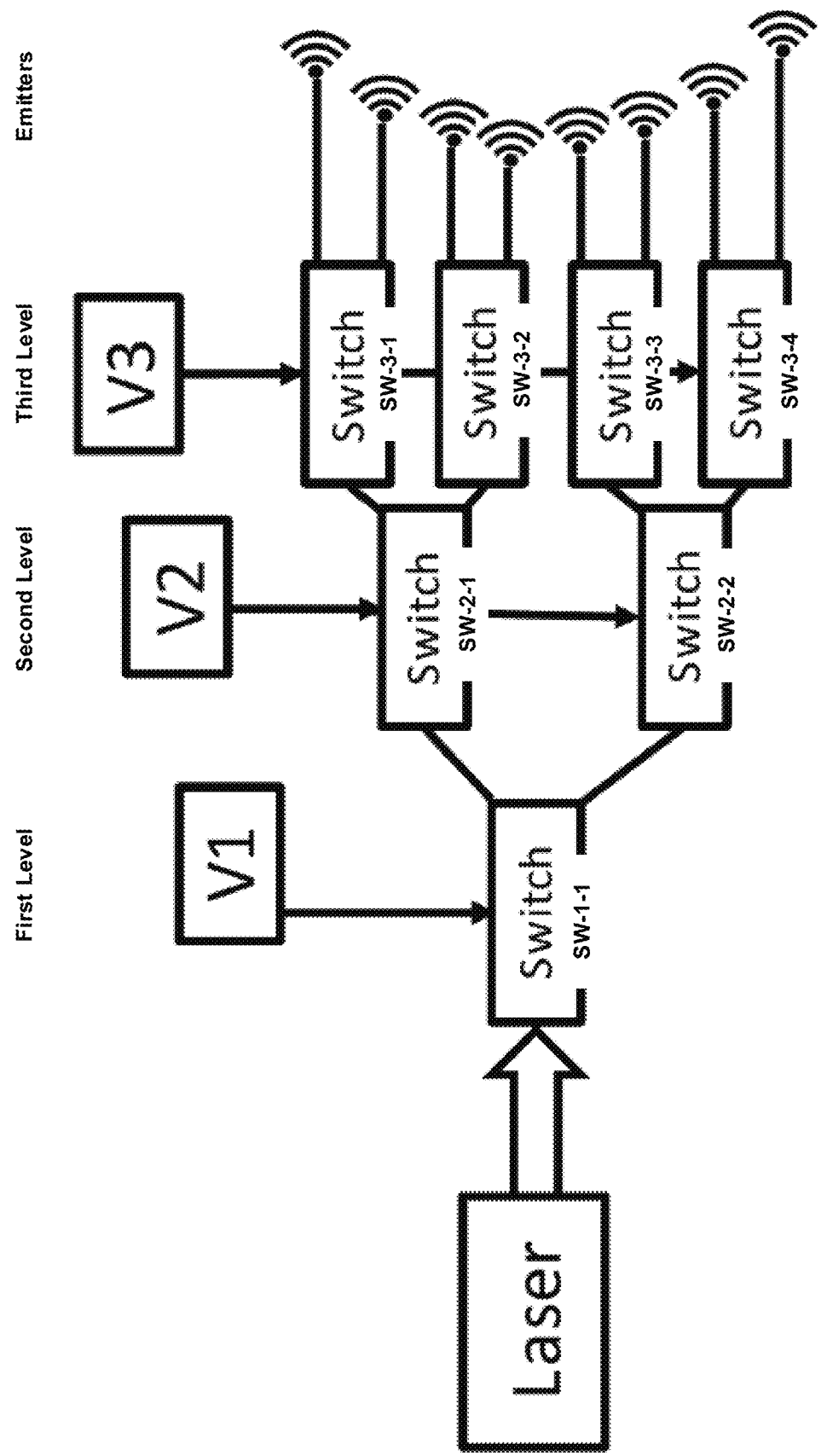
FIG. 2 is a schematic diagram illustrating a configuration of a photonic switched array tree in which power from a laser is switched between the arms of the tree and each emitter receives the total power at sequential instances in time according to aspects of the present disclosure.

With these principles in mind, turning now to FIG. 2, there is shown a schematic diagram of an illustrative, basic, photonic switched array tree. As may observed from that figure, an array of emitters is in optical communication with a light source (laser) through the effect of a switched array tree comprising a plurality of 1×2 switches arranged in an uprooted tree topology. Depicted in that figure, output power from a laser is switched between arms of the tree through the effect of switches in response to applied voltage(s). As will be readily understood by those skilled in the art, the switches (for example, Mach-Zehnder interferometers) may be optically interconnected by any of a variety of known optical waveguides that—in an illustrative embodiment—may be integrated onto a silicon photonic substrate along with the emitters.

Operationally, each illustrative individual switch in the tree of switches is controlled by the application of a suitable voltage. Accordingly, the three-level tree of switches shown illustratively in FIG. 2 delivers optical power emitted from a laser to a designated emitter, or—as we shall show—emitters.

At this point it is noted that while we have shown and described this illustrative configuration as employing a switched array tree having 1×2 switches, our disclosure is not to be considered so limiting. More specifically, any configuration of switches are contemplated (i.e., 1×3, 1×4, . . . , 2×2, 2×3, . . . etc). The tree illustrated is a topology known in the art, that is there are no circular paths between nodes (switches). As we shall show and describe further, the switch type(s) in a particular switched array tree need not all be of the same type, or technology (i.e., thermos-optic, electro-optic, etc.).

Worth noting further at this point is that the emitters employed may likewise be a variety of those known in the art. Optical emitters that may advantageously be employed according to the present disclosure include—for example—an optical grating, end-fire facet, plasmonic emitter, metal antennae, and mirror facet—among others.

Starting from the laser, the very first switch (SW1-1—first level—controlled by V1) directs light output by the laser to the upper or lower half of the switch array tree. Accordingly, at the second level, only one of the two switches (SW2-1, SW2-2)—both of which are controlled by V2—receive light output from first level switch depending on how the first level switch is controlled by V1. Even though in an ideal case the switches controlled by V2 are identical and the voltage required to control them is equal, in a practical system these will be slightly different from each other—and from V1 as well.

The same is true for the third level switches. All four of them are identical by design but will have slightly different voltage requirements for perfect (0%-100%) power switching between its two output ports. It is noteworthy that even though these switches require a voltage which is slightly different from their neighbor, they do not require a separate wiring. This is due to the fact that in this illustrative example only one of the switches at a given level is receiving light at any moment in time. Accordingly, the state(s) of the other switch(es) at that level are of no consequence.

Figure 3:
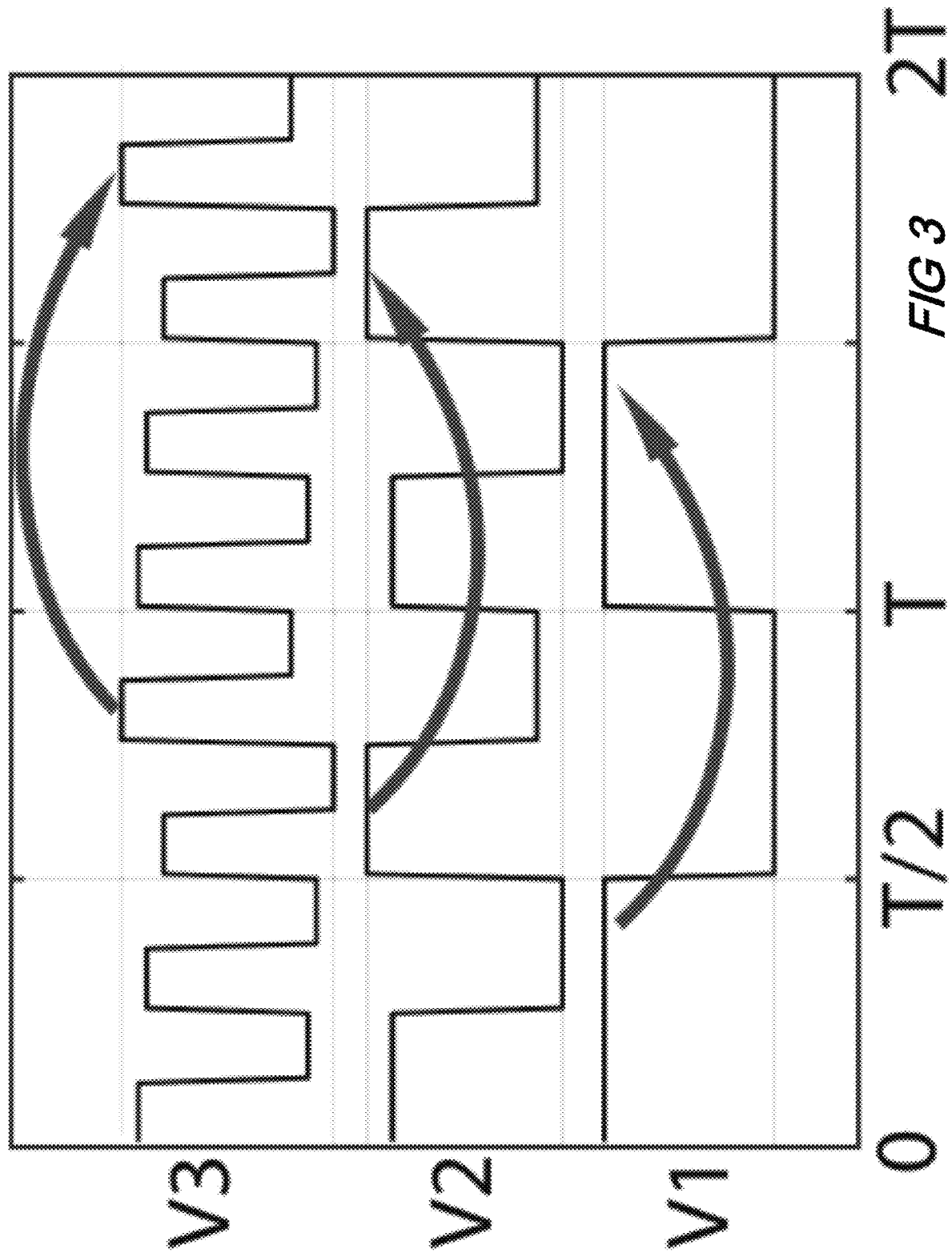
FIG. 3 is a series of timing diagrams illustrating switching voltages required for the first three stages of a power delivery tree for the illustrative configuration depicted in FIG. 2 according to aspects of the present disclosure.

Turning now to FIG. 3, there is shown a series of timing waveforms showing switching voltages required for the first three stages of an optical power delivery tree such as those illustratively shown and described herein. As can be seen in FIG. 3, V1 switches between the optimal values for the first switch (SW-1-1). V2, controls all the switches on the second-level (SW-2-1, SW2-2) changes value at twice the frequency of V1.

As may be observed and understood, in first half period (0–T/2), the first switch directs light to the upper half of the array i.e., to SW-2-1. From the discussion above we know that during that first half period of time, the uppermost second level switch (SW-2-1) goes between the values optimized for that switch and drives the other, lower second level switch (SW-2-2) with it redundantly.

As will be readily appreciated by those skilled in the art, this simple, illustrative scheme—while not being the most power efficient method to drive the switched array tree—greatly simplifies the overall system with respect to the number of I/O pads and control signals required to control the switch tree. More specifically, an array tree of N elements—when configured in this simple manner—requires only log 2(N) control signals rather than N-1 control signals if each switch had its individual wiring and I/O pad. As will be further appreciated by those skilled in the art, this simple illustrative configuration results in at least half of the switches in the tree consuming power while only log 2(N) of them are switching (directing) light at any given time.

Figure 4:
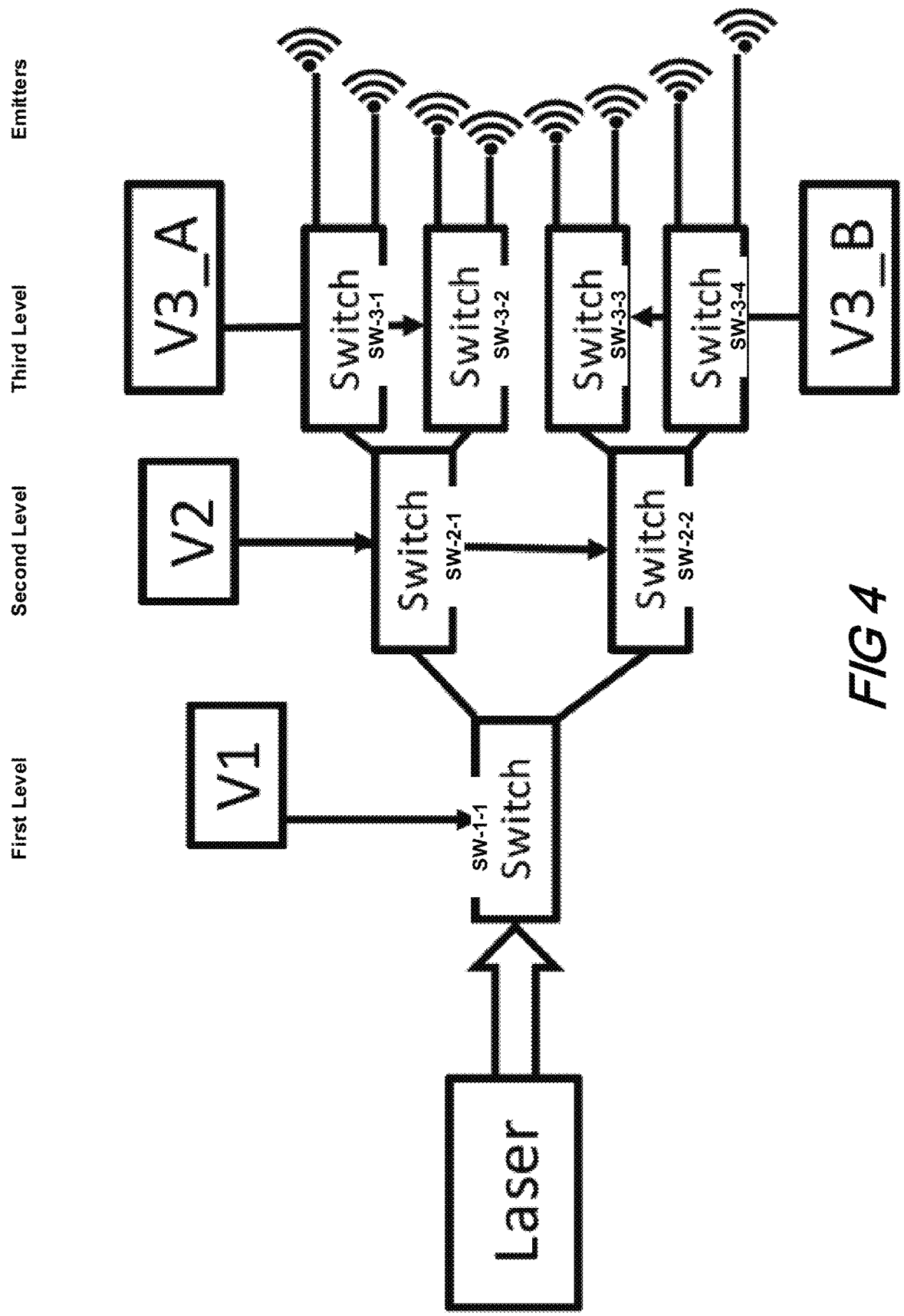
FIG. 4 is a schematic showing an illustrative switched array tree wherein voltage controlling stages having multiple switches may be divided among more than one pad/wire to reduce current required and power consumption according to aspects of the present disclosure.

Note, however, that if overall power consumption and current delivery of the switch tree array is more important than the number of I/O pads required, a smaller number of the switches can advantageously be wired in parallel. With reference now to FIG. 4—that shows an illustrative switched array tree wherein voltage controlling stages (levels) having multiple switches may be divided among more than one pad/wire to reduce current required and power consumption according to aspects of the present disclosure.

For example, as can be seen in FIG. 4, the V3 control signal—used to control third level switches SW-3-1, SW-3-2, SW-3-3, SW-3-4, may be divided into two separate signal voltages. In this illustrative situation, at time period 0-to-T/2 illustrated in FIG. 3—when only the top half of the array is used (determined by V1)—all of the switches used at the third level of the array that are not functioning (SW-3-3, SW-3-4) can be set to zero power. Therefore, by adding one I/O pad (V3_B) the overall power consumption is reduced.

As will be readily appreciated by those skilled in the art, a design tradeoff results from these illustrative, alternative configurations. Extra I/O pad(s) and interconnecting circuits are required to provide this improved, reduced power consumption. Such design tradeoff's may be advantageously made on a case-by-case basis.

Note that a large area switch tree array and corresponding phased array (several millimeters or larger across) with elements spaced near (or smaller than half wavelength) apart, will contain thousands of elements. Such a switched array tree will have ten or more levels of switching before light reaches an emitter. Accordingly, a necessary design tradeoff must be made in such a situation between the number of I/O signals employed—which is at least 10-20 and can reach thousands if each switch is addressed individually—and the power consumption that can scale inversely with the number of I/O signals/pads employed.

Figure 5:
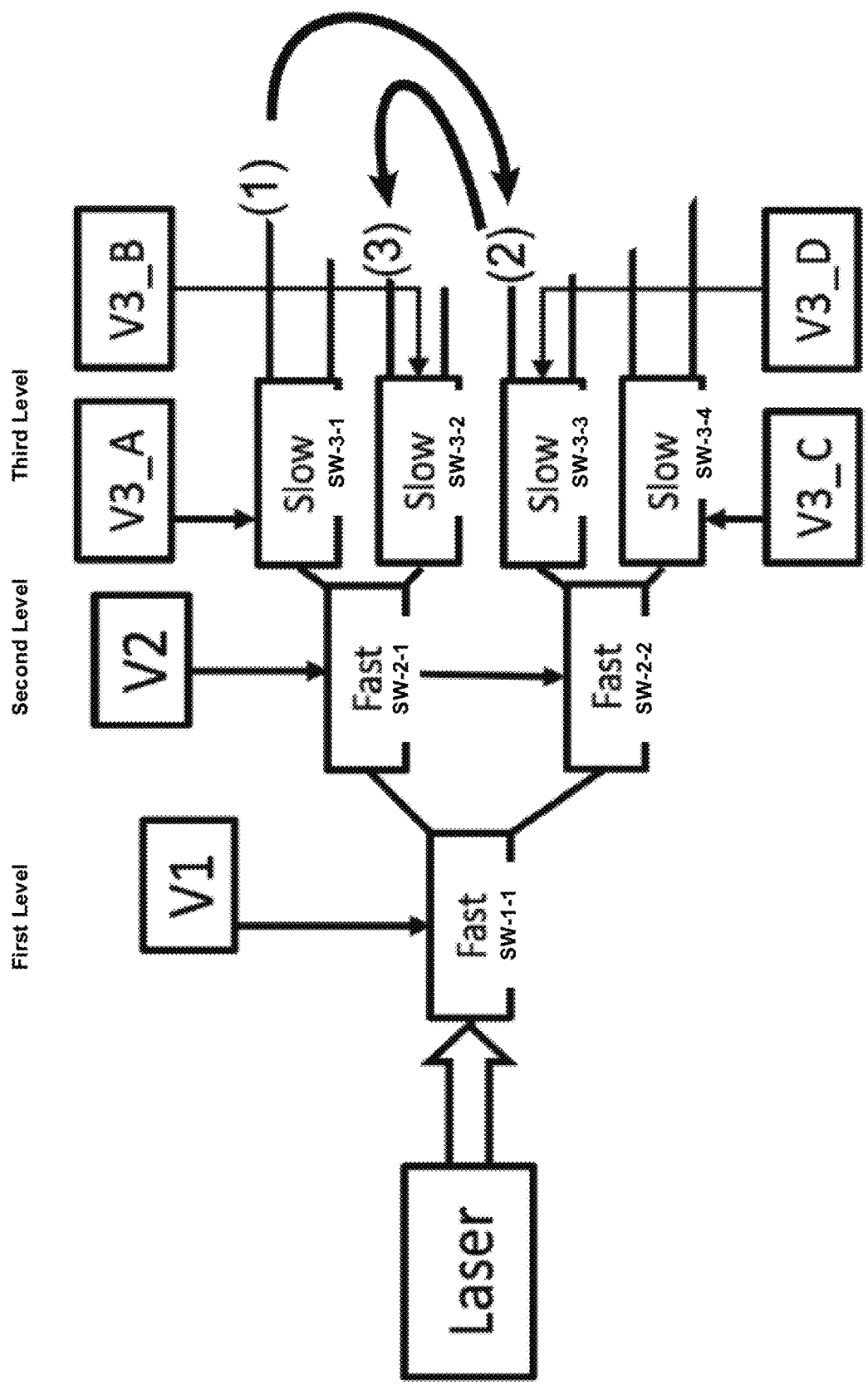
FIG. 5 is a schematic showing an illustrative switched array tree wherein faster switches employed in earlier stages and proper sequencing allows for slower switches at later stages according to aspects of the present disclosure.

As we shall now describe, another aspect of a switched array architecture according to the present disclosure is that the time scale and the power consumption of different switch layers in the array is not necessarily the same. FIG. 5 is a schematic showing an illustrative switched array tree wherein faster switches employed in earlier stages and proper sequencing allows for slower switches at later stages according to aspects of the present disclosure.

As may be observed from that FIG. 5, the array can be operated in a manner that the time between neighboring emitters receiving light is maximized. In such a scenario, two neighboring emitters may be selected between the two neighbors by a single, slow switch. Such a configuration is made possible due to a switch at the last level has a significantly longer time to change its state as compared with prior level switches because it only sees light at a fraction of time and the time in between those instances can be used for a slow (but possibly low loss or low power) transition. Note further that such operation permits a selection of emitter(s) that are not necessarily sequential. In this illustrative depiction, the topmost emitter (1) is selected, then others (2), and then (3) which are not in physical, sequential order of the array.

FIG. 6 is a series of timing diagrams illustrating that switching time constant(s) of higher level switches may be longer than in prior levels (stages) according to aspects of the present disclosure. For example, FIG. 6, shows a scenario in which the first two levels of the switch tree array are controlled by fast switches. The third level of the tree has a much slower switch which receives light only when the first switch and the second switch are in a high-state (grey areas). In this situation, the switch controlled by V3_A (SW-3-1)—shown in in FIG. 5—which is responsible to direct light to either emitter of the first neighboring emitters (1 or 2), can be significantly slower in transition than the first two switches because it does not receive light outside of the shaded regions of the timing diagram of FIG. 6.

Advantageously, and as will be readily understood and appreciated by those skilled in the art, physical mechanisms employed for lower and higher levels of switches can be different. Note that with respect to the above discussion, first level(s) of switches only transition between on/off/up/down states a few times per total array scan but hold each state for extended periods of time (as long as T/2 for the first level switch). On the other hand, the later or last level(s) of switches (i.e., final branches of the switch tree) can be in transition each time a far field point of view changes. Consequently, initial levels (stages) of the tree can utilize switches that consume more power in the transition state (like reverse biased pn junction based electrooptic phase shifter Mach-Zehnder switches), while end branch levels of the tree can utilize switches that consume power only when they are in a switching mode (i.e., on/off or up/down transition) and not in the rest state (e.g., thermooptic or electrooptic switches).

At this point we may now describe how systems, methods and structures according to the present disclosure may operate in illustrative applications. With simultaneous reference now to FIG. 7(A) and FIG. 7(B), there is shown a schematic diagram illustrating a switched array structure according to the present disclosure employed as part of a LIDAR wherein the same switched array functions as both emitter and collector element(s). As we shall show and describe, such configuration(s) may be generally known as "monostatic" configurations as the same emitter/aperture is used for both transmit/receive functions.

Accordingly, and as shown schematically in the figures, the switched array, operates as a transmit and receive component of a LiDAR or a free space communications system. Illustratively, a frequency-modulated continuous wave laser detection and ranging (FMCW) LiDAR system is illustratively shown wherein the same array simultaneously functions as a send and receive element due to the time symmetry of nonmagnetic optical systems.

As will be readily understood and appreciated by those skilled in the art, light travelling along a certain path—when scattered and/or reflected by an object—will have a portion of that scattered light travel the exact same path—in reverse—where it may be detected at the origin.

Figure 7A:
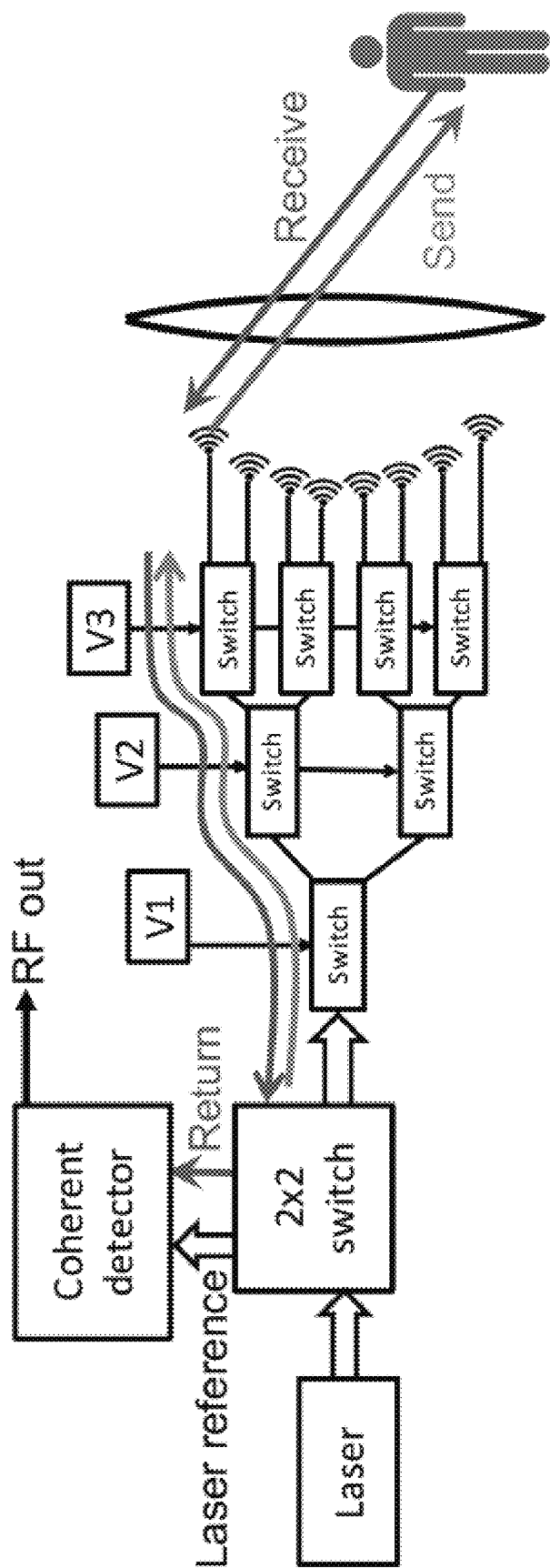
FIG. 7(A) is a schematic of an illustrative switched array tree showing a same switched array function as both emitter and collector element (monostatic) according to aspects of the present disclosure.
Figure 7B:
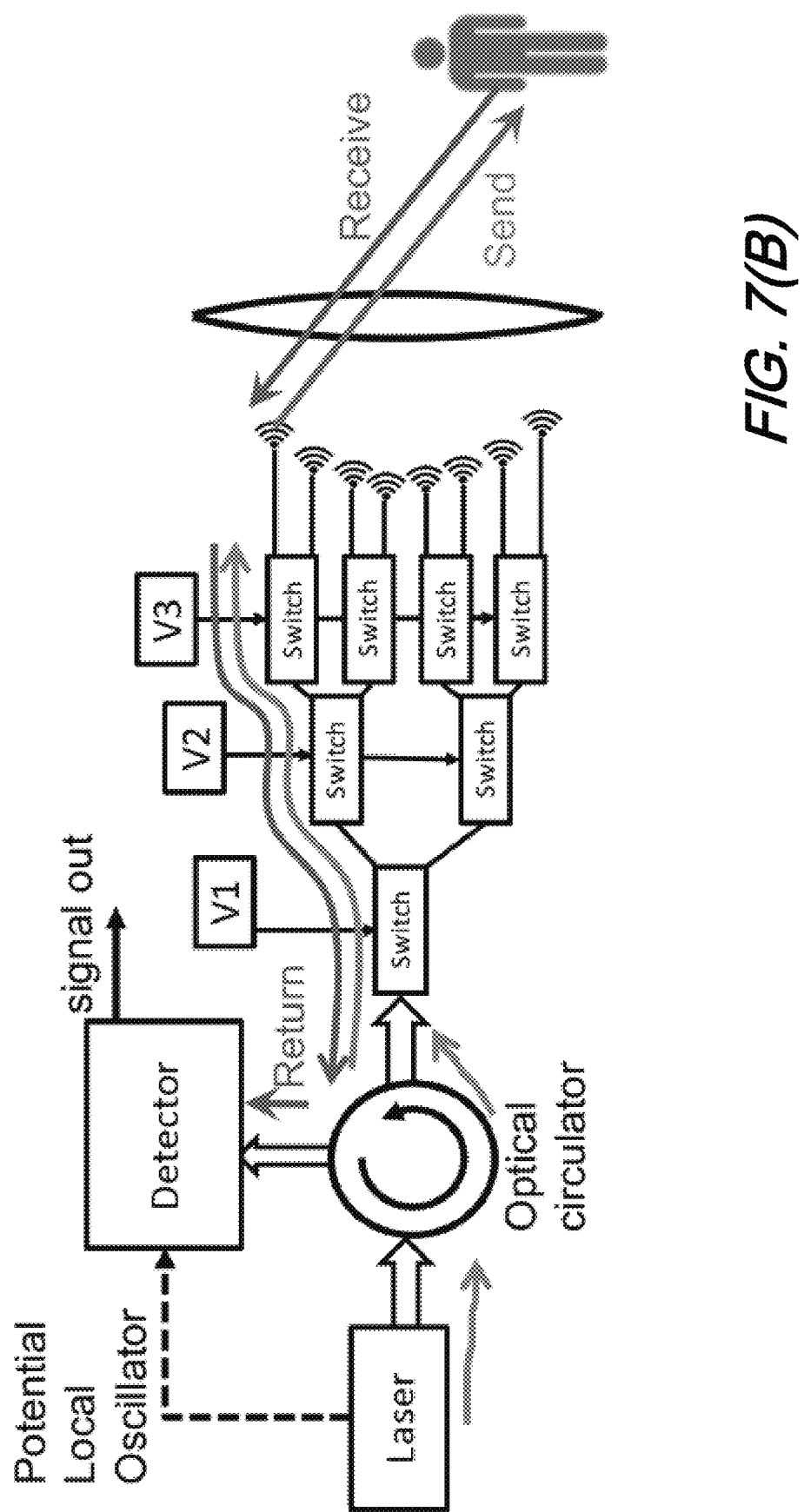
FIG. 7(B) is a schematic of an illustrative switched array tree showing a same switched array function as both emitter and collector element and further including a circulator to separate the transmit (emitter) and receive (collector) signals according to aspects of the present disclosure.

With reference to that FIG. 7(A) and FIG. 7(B), it may be observed that an array of emitters is optically interconnected to a laser light source through the effect of a switched tree array or other analogous distribution network. As illustrated in those figures, each level of the switch array is shown illustratively controlled by a signal voltage, i.e., V1 for level 1, V2 for level 2, and V3 for level 3 switch(es). Selective application of the level voltages to the particular level switch(es) will direct light emitted from the laser to a particular emitter.

Shown interposed between the laser source and the switch array, is an illustrative 2×2 switch (FIG. 7(A))—or alternatively, an optical circulator (FIG. 7(B)). Such redirector (switch or circulator) provides the optical communication for a laser reference and—as we shall discuss—a return(ed) signal—both of which are directed through the effect of the redirector to a detector—i.e., coherent detector in this illustrative example.

Operationally—and by way of specific illustrative example only using FIG. 7(A) and not in any way limiting—laser light is emitted from the laser source and received by the 2×2 switch. A portion of that received source light is directed to a coherent detector where it serves as a reference for coherent detection processes. Another portion of that received source light is directed to a switched tree array distribution network. As previously noted and discussed, specific application of switches comprising the switched tree array distribution network direct that source light to a specific emitter, where it is emitted and possibly subsequently reflected by an object situated in object space.

As noted further previously, a portion of that reflected light will travel the same path traversed after emission—in reverse. That reflected light so traveling the reverse path will be collected by a same emitter as transmitted, directed back through the switched tree array to the 2×2 switch (redirector), where it is directed to the coherent detector for detection. In this way, the same path through the switched tree array distribution network is bidirectional—that is provides both transmit and receive path(s). As noted above, such a configuration may be known as monostatic.

We note at this point that as shown schematically in FIG. 7(A) and FIG. 7(B) a lens or other optical element is shown in the optical path of the emitted light at the emission side of the emitters to further direct/collect transmitted/received light as appropriate. Such lens/optical element may be any of a variety that directs/collects light as desired. Note further that while a single lens is shown illustratively, a different number of lens(es)/optical elements are contemplated and may include—for example—an array of such lenses/optical elements. In particular embodiments, such optical elements may serve to flatten the focal curvature of the emitter array.

In particular, while we generally have shown the array of emitters as arranged along a curved arc substantially at a focal point of the external lens, our disclosure is not so limited. More particularly, with an appropriate choice of lens—i.e., a double convex lens—the focal plane will flatten. As such, the array of emitters may be positioned along a line that is not curved—provided additional, appropriate optical element(s) (lenses) are interposed in an optical path after the emitters (distal).

As will be understood, the configuration shown in FIG. 7(A), will have the advantage of simplicity of design and operation but can suffer from on-chip reflections from the switching elements, the emitters and any lens(es). Accordingly, the configuration shown and described with respect to FIG. 7(B) in which the switch is replaced by a circulator will mitigate these disadvantageous reflections.

Figure 7C:
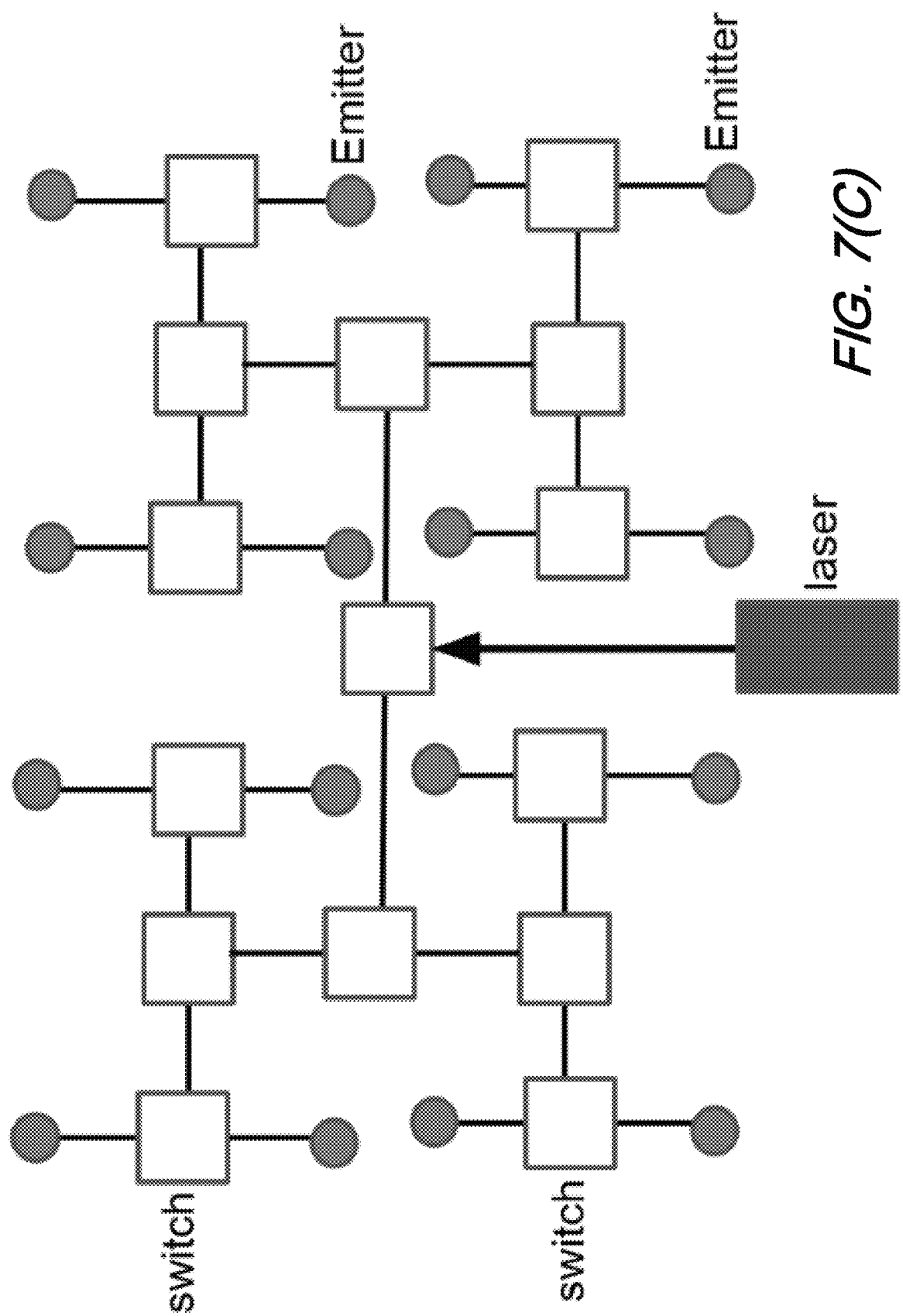
FIG. 7(C) is a schematic of an illustrative switched array tree and laser light source wherein the emitters emit light out of plane according to aspects of the present disclosure.

FIG. 7(C) is a schematic diagram showing an illustrative example of a laser in optical communication with a plurality of emitters through the effect of a switched array wherein the emitters are configured to emit out of plane. Note that while this illustrative switched array shown in this figure—while employing a plurality of individually controllable 1×2 switches—such configuration is not necessarily required according to the present disclosure. In particular, alternative switch configurations may be employed with the condition that no circular paths between source and emitter is produced. Note further that all of the other aspects we have described namely, individual levels, single electrical pad controlling multiple switches at a given level, etc., are all contemplated with this illustrative configuration as well.

Figure 7D:
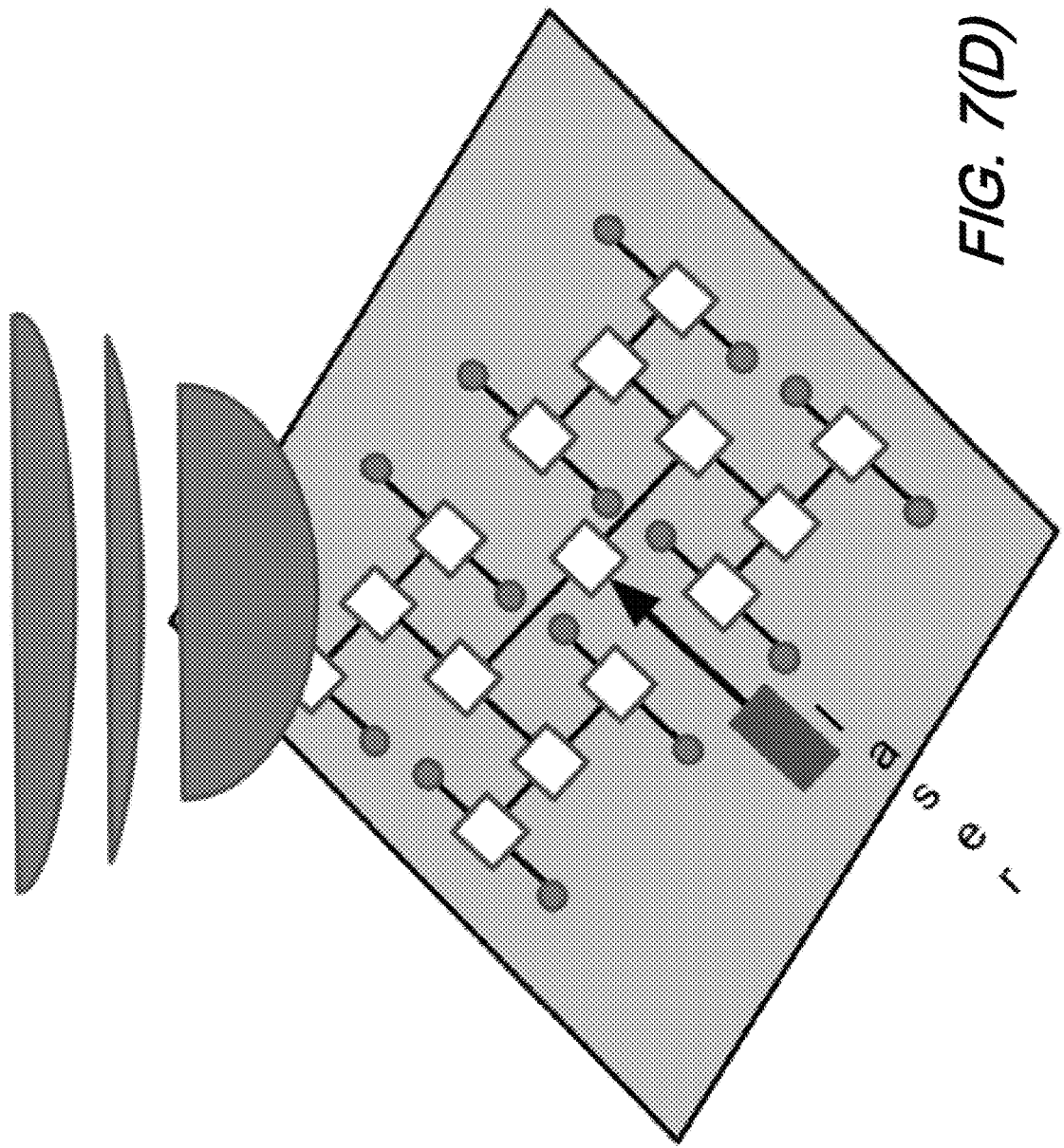
FIG. 7(D) is a schematic of an illustrative switched array tree and laser light source wherein the emitters emit light out of plane and a multi-lens system is employed to provide a "flat" focal plane according to aspects of the present disclosure.

FIG. 7(D) is a schematic showing an illustrative flat focal plane for the out of plane configuration illustrated in FIG. 7(D) in which a multi-lens system is employed in an optical path of the emitted light. As described previously and illustratively shown schematically in this figure, such optical elements positioned in the optical path after emission may produce such a flat focal plane.

Figure 8A:
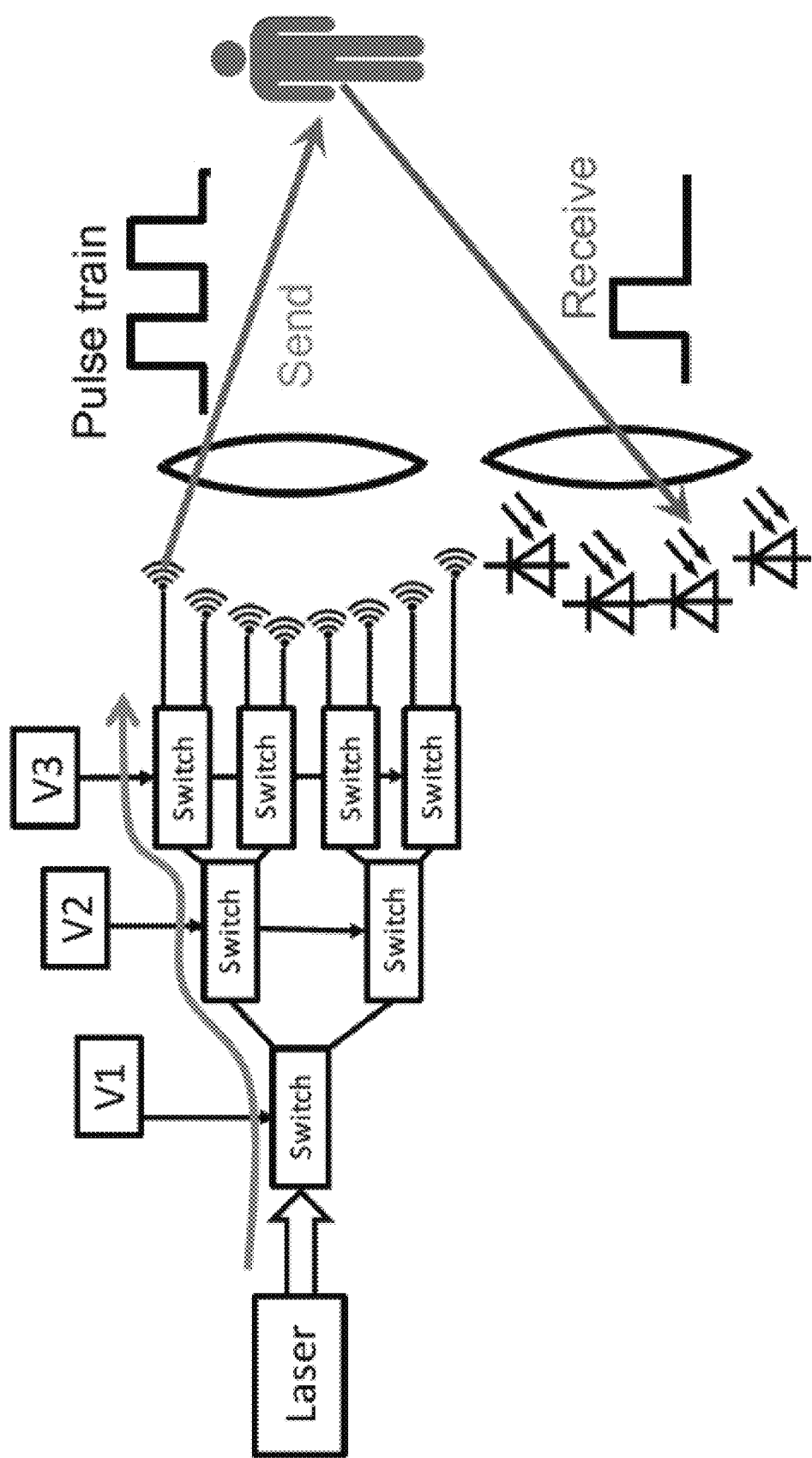
FIG. 8(A) is a schematic of an illustrative switched array tree showing a two-lens configuration of a switched array using for pulsed (flash) LiDAR wherein an array of detectors are employed that are not part of the switched array according to aspects of the present disclosure.

FIG. 8(A) is a schematic diagram showing an illustrative alternative to the configuration of FIG. 7(A) and FIG. 7(B) according to aspects of the present disclosure that may advantageously be employed—for example—in a pulsed or "flash" LIDAR application. As illustratively shown in FIG. 8(A), one switched array is employed as an emitter element while a focal array of detectors is employed as receiving element(s). Note that in this illustrative configuration, the detector "array" may include only a single detector—or a plurality of detectors as illustratively shown in the figure. Note further that configurations such as that shown in FIG. 8(A), and in FIG. 8(B), a distance between emitter and reflecting object may advantageously be determined in a number of ways.

As will be readily appreciated by those skilled in the art, such pulsed LiDAR systems and methods enable practitioners to sweep or scan large areas while collecting billions of data points, each with precise latitude, longitude, and elevation (x, y, z) values within a local (relative) coordinate system. This aggregation of the billions of data points is oftentimes referred to as a point cloud data set. Practitioners subsequently extract object locations from the point cloud data set and use that location information for subsequent decision making.

Known further by those skilled in the art, point cloud data sets may be collected by a Geiger Mode Avalanche Photo Diode (GmAPD_-based LiDAR systems—a number of which are known in the art. Operationally, GmAPD-based LiDAR systems generally comprises a transmitter including laser transmitter(s) and transmitting optics, receiver including receiving optics and photo-detector(s), and processing system(s) (not specifically shown in FIG. 8(A) or FIG. 8(B)).

When installed or otherwise mounted on movable platforms such as an automobile, such LiDAR system(s) may be configured or individually combined to sweep or scan over a large volume such that a full 360-degree environmental view may be made.

Accordingly, the transmitter periodically transmits interrogating signal(s) into a detection region from which they may be reflected back as return signal(s). Generally, the interrogating signal(s) are a train of optical-pulses exhibiting a period and a wavelength and intensity suitable for interrogating the detection region. The wavelength(s) of the interrogating signal(s) are oftentimes in the range of 900 nm to 2000 nm however, other usable wavelengths are known in the art.

In an illustrative GmAPD-based LiDAR system embodiment such as that illustrated in the figure, the transmitter will include a laser source—such as a diode laser—which emits an optical pulse train of interrogating signal(s) in response to drive signal(s) from—for example—a processing system (not specifically shown). As each optical pulse of interrogating signal propagates through the detection region, objects reflect a portion of a pulse's optical energy back toward system as reflected optical pulse(s) in receive (returned) signal(s) which may be detected by a receiver.

In contemporary embodiments, the receiver may include an array of GmAPD detector pixels. As will be readily appreciated and understood by those skilled in the art, one particular advantage of GmAPDs is that they quickly produce an electrical pulse in response to the detection of even a single photon—allowing for sub-nsec-precision photon-flight-time measurements. When each pixel is armed, it may detect a low-intensity reflection of an interrogation signal (return signal) and output a signal to be detected and subsequently used by the processing system. As shown illustratively in the figure, the array of detectors is positioned substantially at the focal plane of another (receiver) lens.

Figure 8B:
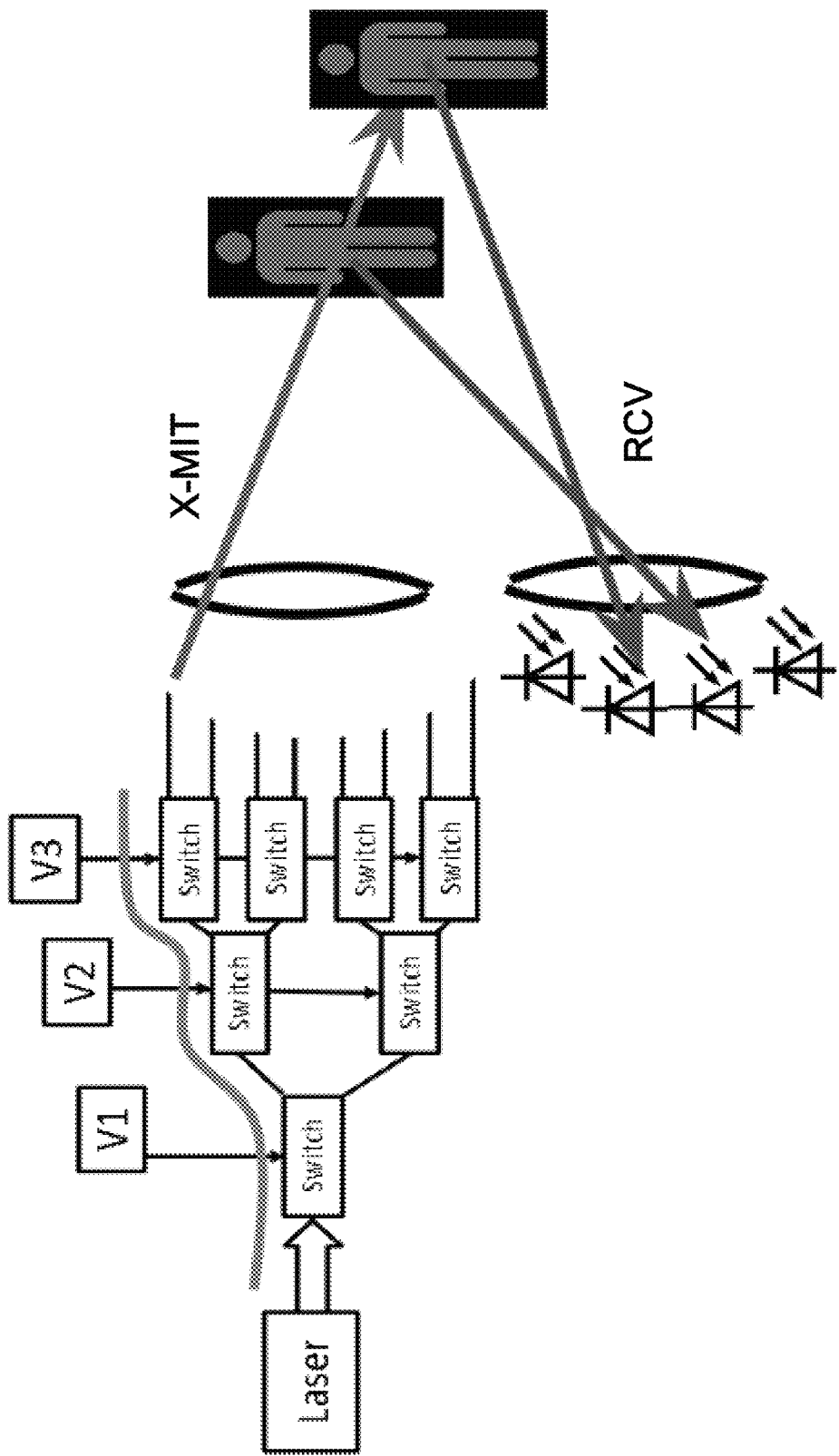
FIG. 8(B) is a schematic of an illustrative switched array tree as shown in FIG. 8(A) wherein transmitted signals are reflected from two objects in object space and the reflected light is detected from multiple, corresponding detectors in the detector array according to aspects of the present disclosure.

FIG. 8(B), shows a disparate detector array—like that shown in FIG. 8(A), wherein emitted light is reflected from two distinct objects located in object space. Shown further in that figure, light reflected from those objects are subsequently detected by multiple detectors in the receiver detector array. Advantageously, when so configured, a distance between emitter/detector and object(s) may be determined by triangulation or—alternatively—time of flight (TOF). Note further that such configurations shown illustrative in FIG. 8(A) and FIG. 8(B) do not utilize or employ a return path that is the reverse of the transmit path as shown previously with respect to monostatic configurations.

Figure 9:
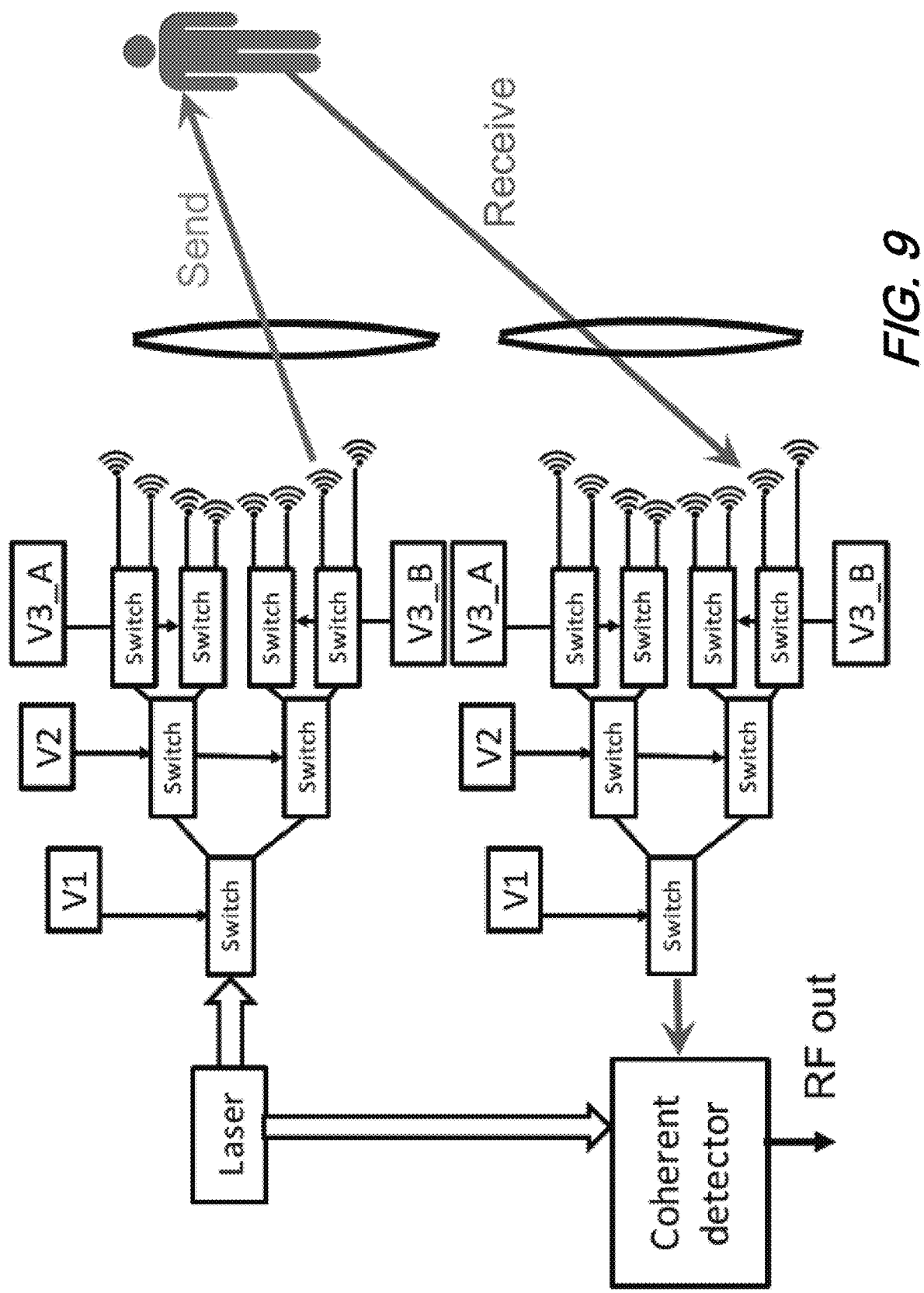
FIG. 9 is a schematic of an illustrative switched array tree showing a two lens and two tree configurations for LiDAR according to aspects of the present disclosure.

FIG. 9 shows a schematic of yet another illustrative system according to the present disclosure illustrating a two lens and two switched tree configurations of an FMCW LiDAR system. As may be observed from that figure, such system includes two separate switched tree array distribution networks, one for transmit (send) and the other for receive signals. Such configuration is known as a bistatic configuration as the emitting aperture and receiving aperture are not the same aperture. Notwithstanding this distinction, as we shall show, the emitting and receiving apertures—while different—may be located at a same, corresponding position in an array. For example, in the illustration shown in FIG. 9, the $7^{th}$ emitter in the emitter array is used and the $7^{th}$ receiver (emitter) is used in the receiver array. Other, corresponding emitter/receiver pairs may be likewise employed.

At this point we note that while we have used the terms emitter and receiver, such structures may exhibit the same—or different—structural characteristics. For example, an "emitter" may comprise an end facet while a receiver may likewise comprise an end facet. That is to say, such emitters and receivers may be any suitable optical "antenna". Note further that while such receivers may be constructed like any emitter such as those identified earlier, a given emitter/receiver complementary pair do not have to be of the same construction. That is to say, an emitter may comprise a grating while a receiver may comprise an end facet—or any other combination.

Continuing with our discussion of FIG. 9, there it may be observed a laser source provides transmit (interrogation) light to one of the two switched tree distribution networks while the other receives returned and collected light from an object in interrogation space and directs that light to a detector which, in this illustrative configuration is shown as a coherent detector.

As shown in this illustrative configuration, light emitted from a particular emitter—in this scenario the $7^{th}$ emitter—will be reflected/scattered from an object and received by a corresponding $7^{th}$ emitter/detector. As will be further understood by those skilled in the art, since the two switched tree distribution networks correspond to one another, a common set of control signals applied to each network will activate appropriate corresponding switches in each network for complementary emission/reception.

We note that such configurations that include two lenses (or multiple lens configurations or combinations thereof), or two lenses and two trees, advantageously do not generally suffer from reflection effects of the single transmit tree (monostatic) configurations described previously. In the illustrative example shown in the figure, the receive tree will receive the reflected/detected signal(s) and direct same to the coherent detector. As illustrated, the coherent detector receives a portion of the laser power as a local oscillator thereby permitting information determination from/about time of flight data. Note that as illustrated a beat signal may be generated at a root of the receiving switched tree by one coherent detector or at an end of the tree by multiple local oscillators each receiving the local oscillator laser power in turn by a switching tree.

Figure 10:
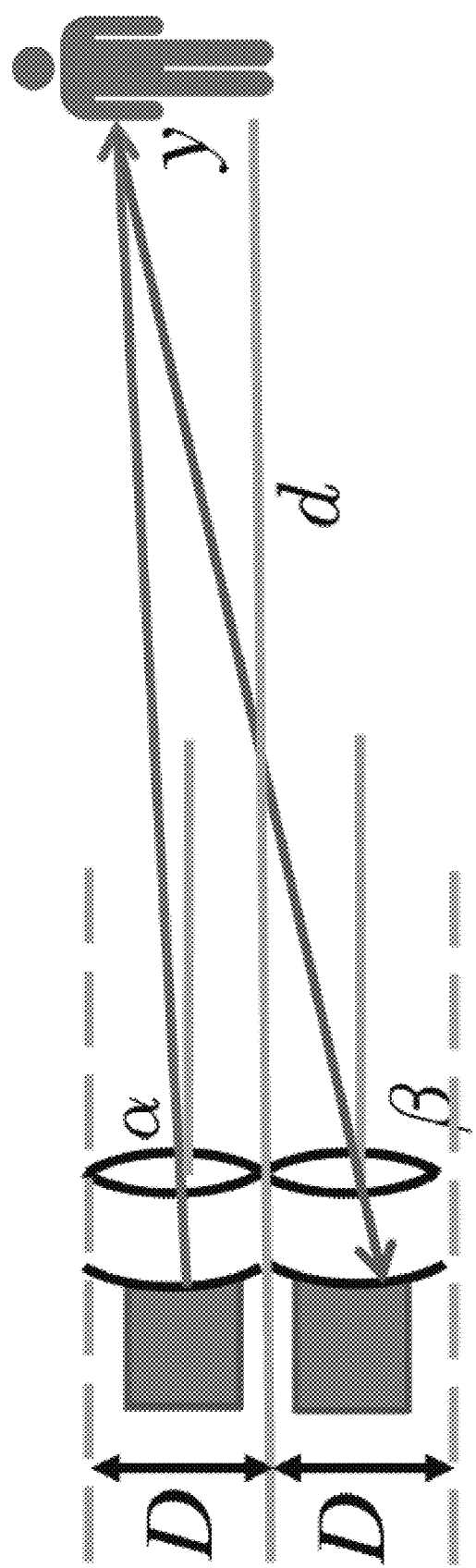
FIG. 10 is a schematic showing an illustrative two lens system wherein send and receive signals can be at different angles in the far field depending on the distance of an object from a LiDAR system according to aspects of the present disclosure.

As will now be readily understood and appreciated by those skilled in the art, one feature of such two lens systems is the misalignment of the send and receive beams. Turning now to FIG. 10, there is shown a schematic diagram illustrating that in a two-lens system, the send and receive signals may be at different angles in the far field depending on the distance of the object from the (LiDAR) system. As can be seen in FIG. 10, the closer the object is to the two-lens system, the more divergence in the angles of the send and receive signal will appear. Therefor this misalignment should be taken into the account when two switched array trees are employed in a system such as that shown in FIG. 9. As those skilled in the art will now readily appreciate, this feature may advantageously be used for distance measurement (similar to depth perception of humans with the eyes located on the two sides of the face).

We note that for a one-dimensional integrated optics switched array the terminated end of the waveguides can function as a perfect, broadband emitter without requiring a grating or any other sophisticated radiation mechanism. On the other hand, as the waveguides are placed a few micrometers apart from each other, far field operation of the array becomes more discrete (discretized) with the angular resolution being dependent on the focal length.

Figure 11:
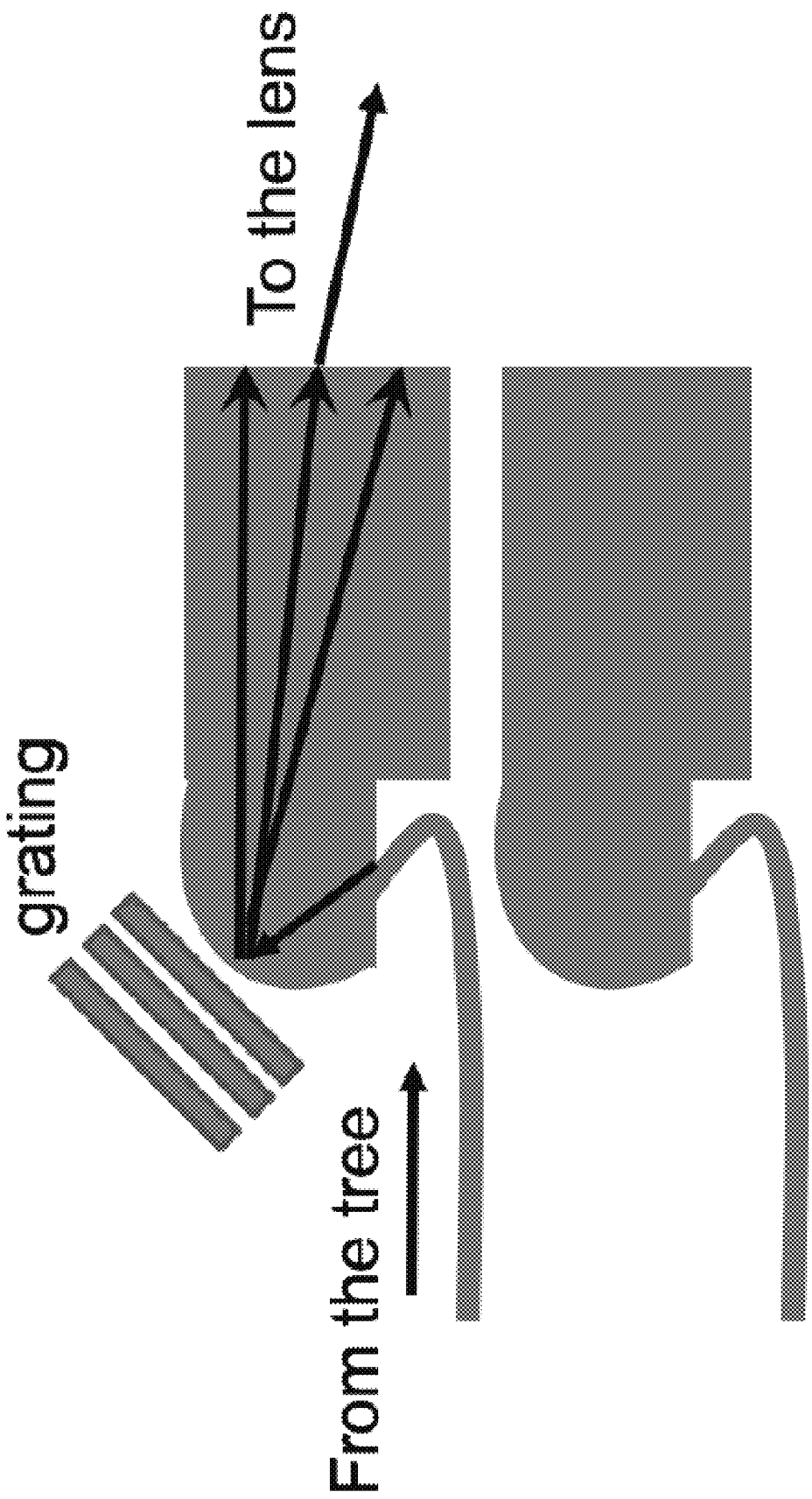
FIG. 11 is a schematic showing an illustrative use of a focusing grating at an output of a switching tree enabling fine adjustments of spot location thereby enhancing far field scanning according to aspects of the present disclosure.

One approach to improve this resolution is to change the wavelength of the laser slightly. With reference to FIG. 11, there is shown a focusing grating positioned an optical path of light emitted from an emitter. More specifically, the focusing grating is positioned in the optical path of the emitted light after the emitter and before the object in object space. A focusing grating positioned at the end of the switched tree will focus the light into a spot however, the focusing point is wavelength dependent and therefore moves slightly with changing wavelength. If the tunability range of the laser is enough to move the focal spot between the two original tree outputs, the far field viewing capability of the array will be continuous with rough scanning achieved by the switching tree and fine movements achieved by the laser wavelength.

At this point, while we have presented this disclosure using some specific examples, those skilled in the art will recognize that our teachings are not so limited. In particular, while we have shown and described various illustrative configurations employing switched binary tree distribution networks optically connecting a source to a plurality of emitters, this disclosure is not so limited. In particular, a selectively, switchable distribution network of any size and topology between laser and emitter is contemplated and included in this disclosure. Accordingly, this disclosure should be only limited by the scope of the claims attached hereto.

The invention claimed is:

1. An optical structure comprising:
   a light source;
   a plurality of optical emitters;
   an optical power distribution network optically connecting the light source to the plurality of optical emitters, said optical power distribution network including a plurality of individually controllable switches; and
   a plurality of gratings, where two or more of the plurality of optical emitters is each configured to direct optical power to a corresponding one of the plurality of gratings;

wherein said switches are configured such that optical power emitted from the light source that enters the optical power distribution network will be emitted from a selected subset of the plurality of optical emitters.

2. The optical structure of claim 1 wherein the plurality of individually controllable switches are organized into levels of switches and switches at a same level are all switched simultaneously.

3. The optical structure of claim 1 wherein the plurality of optical emitters are arranged along a common arc.

4. The optical structure of claim 1 wherein the plurality of individually controllable switches are organized into levels and switches at one level operate at a speed different from the speed of operation for switches at a different level.

5. The optical structure of claim 4 wherein the switches proximate to the plurality of emitters operate at the slowest speed(s).

6. The optical structure of claim 1 further comprising an optical element positioned in the optical path of the emitted optical power.

7. The optical structure of claim 6 wherein the optical element comprises a lens.

8. The optical structure of claim 1 wherein the optical power distribution network is a tree network and the switches include at least one of: one or more 1×2 switches, one or more 1×3 switches, one or more 1×4 switches, one or more 2×2 switches, or one or more 2×3 switches.

9. The optical structure of claim 1 wherein the optical power distribution network and the plurality of emitters are fabricated on a common substrate.

10. The optical structure of claim 1 wherein the optical power distribution network, the plurality of emitters, and the light source are all resident on a common substrate.

11. The optical structure of claim 1 further comprising a coherent receiver.

12. The optical structure of claim 1 wherein each one of individually controllable switches is one selected from the group consisting of thermo-optic and electro-optic switch(es).

13. The optical structure of claim 1 wherein each one of the plurality of optical emitters is one selected from the group consisting of: an optical grating, end-fire facet, plasmonic emitter, metal antennae, and mirror facet.

14. The optical structure of claim 7 wherein the optical element further comprises a grating and the grating is positioned in the optical path of the emitted optical power between one of the plurality of optical emitters and the lens.

15. The optical structure of claim 7 wherein the lens is configured and positioned to focus optical power from each one of the plurality of optical emitters.

16. The optical structure of claim 6 wherein the optical element is configured and positioned to receive optical power from each one of the plurality of optical emitters.

17. The optical structure of claim 6 wherein the optical element comprises at least one grating.

18. The optical structure of claim 1 wherein the plurality of optical emitters are configured to emit from positions arranged over two dimensions of a plane.

19. The optical structure of claim 18 further comprising an optical element positioned in the optical path of the emitted optical power and configured to produce a substantially flat focal plane coincident with the plane over which the positions of the plurality of optical emitters are arranged.

20. An optical structure comprising:
a light source;
a plurality of optical emitters;
an optical power distribution network optically connecting the light source to the plurality of optical emitters, said optical power distribution network including a plurality of individually controllable switches, where the plurality of optical emitters are configured to emit from positions arranged over two dimensions of a plane; and
an optical element positioned in the optical path of the emitted optical power and configured to produce a substantially flat focal plane coincident with the plane over which the positions of the plurality of optical emitters are arranged;
wherein said switches are configured such that optical power emitted from the light source that enters the optical power distribution network will be emitted from a selected subset of the plurality of optical emitters.

21. The optical structure of claim 20 wherein the plurality of individually controllable switches are organized into levels of switches and switches at a same level are all switched simultaneously.

22. The optical structure of claim 20 wherein the plurality of optical emitters are arranged along a common arc.

23. The optical structure of claim 20 wherein the plurality of individually controllable switches are organized into levels and switches at one level operate at a speed different from the speed of operation for switches at a different level.

24. The optical structure of claim 23 wherein the switches proximate to the plurality of emitters operate at the slowest speed(s).

25. The optical structure of claim 20 further comprising an optical element positioned in the optical path of the emitted optical power.

26. The optical structure of claim 25 wherein the optical element comprises a lens.

27. The optical structure of claim 26 wherein the optical element further comprises a grating and the grating is positioned in the optical path of the emitted optical power between one of the plurality of optical emitters and the lens.

28. The optical structure of claim 26 wherein the lens is configured and positioned to focus optical power from each one of the plurality of optical emitters.

29. The optical structure of claim 25 wherein the optical element is configured and positioned to receive optical power from each one of the plurality of optical emitters.

30. The optical structure of claim 25 wherein the optical element comprises at least one grating.

31. The optical structure of claim 20 wherein the optical power distribution network is a tree network and the switches include at least one of: one or more 1×2 switches, one or more 1×3 switches, one or more 1×4 switches, one or more 2×2 switches, or one or more 2×3 switches.

32. The optical structure of claim 20 wherein the optical power distribution network and the plurality of emitters are fabricated on a common substrate.

33. The optical structure of claim 20 wherein the optical power distribution network, the plurality of emitters, and the light source are all resident on a common substrate.

34. The optical structure of claim 20 further comprising a coherent receiver.

35. The optical structure of claim 20 wherein each one of individually controllable switches is one selected from the group consisting of thermo-optic and electro-optic switch(es).

36. The optical structure of claim 20 wherein each one of the plurality of optical emitters is one selected from the group consisting of: an optical grating, end-fire facet, plasmonic emitter, metal antennae, and mirror facet.

37. The optical structure of claim 20 further comprising a plurality of gratings, where two or more of the plurality of optical emitters is each configured to direct optical power to a corresponding one of the plurality of gratings.

* * * * *